Figure 1:
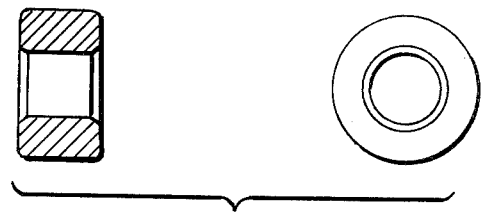

Jan. 30, 1962  A. E. S. WHITE  3,019,068

BEARINGS

Filed March 5, 1959

Inventor:
Albert Edward Sutherland White
By his attorneys:
Baldwin & Wight

United States Patent Office 3,019,068
Patented Jan. 30, 1962

3,019,068
BEARINGS
Albert Edward Sutherland White, London, England, assignor to The Morgan Crucible Company Limited, London, England, a corporation of Great Britain
Filed Mar. 5, 1959, Ser. No. 797,446
Claims priority, application Great Britain Mar. 7, 1958
17 Claims. (Cl. 308—237)

This invention relates to bearings or the like anti-friction elements for shafts and other moving parts and in particular to bearings for use under conditions of high temperatures, for example, temperatures in excess of 500° C.

It is the object of the invention to provide bearings or the like anti-friction elements for running under conditions of high temperature, hereinafter referred to as high temperature bearings, having a low coefficient of sliding friction and having generally excellent running properties under these conditions.

In accordance with the invention the bearing surface of a high temperature bearing contains in major proportions nickel oxide or cobalt oxide or of both oxides.

Generally the amount by weight of nickel or cobalt oxide in the bearing surface may lie in the range 50% to 100% and preferably between 60% and 100%.

The manner in which the nickel or cobalt oxide or oxides are incorporated in the bearing surface is not important, but conveniently the bearing is manufactured from a composition containing metallic nickel or cobalt or both and afterwards subjected to an oxidising process or from a sintered ceramic or metal-ceramic composition containing at least a substantial proportion of oxide powder.

The invention is particularly applicable to bearings formed from sintered powders in which one of the powders is nickel or cobalt, for example, nickel/mullite bearings such as are described in the co-pending patent application of Albert Edward Sutherland White, Serial No. 669,080, filed July 1, 1957, but bearings in accordance with the invention can be produced by casting nickel or cobalt containing alloys, provided they are such that the oxide film subsequently formed on the bearing contains a substantial proportion of nickel or cobalt oxide.

It is not essential that the nickel or cobalt or the oxide should penetrate deeply into the bearing. For example, a nickel or cobalt film or layer may be deposited in the surface of a preformed bearing and subsequently oxidised.

The invention is illustrated by the following examples the parts mentioned being by weight:

EXAMPLE 1

Nickel-mullite (75:25) bearings were made as described in Example 2 of the aforementioned co-pending patent application Serial No. 669,080, and were then heated at about 1000° C. for half an hour in air to produce a surface layer containing nickel oxide.

EXAMPLE 2

60 parts of carbonyl nickel powder (average particle size 5 microns) were mixed with 40 parts of nickel oxide (grey-green laboratory reagent quality) sufficiently fine to pass through a 300 B.S.S. screen. The mixture was wetted with water, ball milled for 24 hours, dried and intimately mixed with 4% of a water wax emulsion sold under the registered trademark "Mobilcer C." A bearing was then pressed to shape at a pressure of 10 tons per square inch. The formed bearing was then heated at about 400° C. to remove the wax slowly and then fired in an atmosphere of commercial argon over a period of 12 hours up to a temperature of 1380–1400° C. The bearings were then heat-treated at about 1000° C. for half an hour in air to ensure complete oxidisation of the surface.

Bearings of outside diameter 2" O.D., inside diameter 1¼" and length 2", made according to the above examples were subjected to running tests on a shaft of heat resisting stainless steel, which had been Stellited (Stellite 12) over the bearing portion and heat treated at 700° C. for 4 hours in an oxidizing atmosphere. For comparison purposes, a bearing made in accordance with Example 1 and a similar but unoxidized nickel-mullite bearing were also tested under the same conditions but running on an unoxidized Stellited shaft.

Test conditions

Constant load—200 p.s.i.
Ambient temperature—700° C.
Running clearance—0.025".
Shaft speed—4.9 ft./min.
Operation—half an hour running, half an hour at rest, load and temperature constantly applied.
Running time (actual)—25 hours (i.e., 50 hours total time in test rig).

Each bearing was relieved over a portion of its surface to give 114° arc of contact between the bearing and the shaft.

RESULTS

|  | Example 1 bearing on oxidised shaft | Example 2 bearing on oxidised shaft | Example 1 bearing on unoxidised shaft [1] | Unoxidised Ni/mullite bearing on unoxidised shaft |
|---|---|---|---|---|
| Average coefficient of friction. | 0.32 | 0.32 | 0.27 | 0.81. |
| Radial wear of bearings | 0.001" | 0.0012" | 0.0005" | 0.001" |
| Surface finish of bearing after test +[2]. | 120 micro inches C.L.A. highly polished, slight formation of hard black layer. | 70 micro inches C.L.A. well polished black surface. | 50 micro inches C.L.A. dull grey surface. | 2300 micro inches C.L.A. two or three patches of welding and Stellite build up. |
| Surface finish of shaft after test +.[2] | 120 micro inches C.L.A. very highly polished no wear. | 70 micro inches C.L.A. well polished black surface no wear. | 50 micro inches C.L.A. dark grey surface slightly polished. | Badly serrated with two deep scores. |

[1] This bearing vibrated somewhat during running.
[2] +=Measured by a "Talysurf" surface roughness measuring machine.
NOTE.—The thickness of the oxide film in Example 2 is 8 microns. C.L.A.=centre line average.

The following examples specify the compositions and methods of treatment to produce an oxide film on the bearing surfaces of a variety of test specimens. Each specimen incorporated a flat bearing surface and tests were carried out by running an annulus of "Stellite 12" counterface material (oxidised at 1000° C. for half an hour) of approximately 1" diameter and 1/16" wall thickness against the bearing surface of each specimen under a pressure of 300 lbs./sq. in. and at a speed of 22 ft. per minute at the area of contact. The ambient temperature was 700° C.

The bearing materials tested were:

*Example 3.*—Cast nickel on which a nickel oxide film was developed by heating in air of 1¼ hours at 1000° C.

*Example 4.*—"Monel" (Cu 30%, Fe 1.4%, Mn 1.0%, balance Ni) on which an oxide film was developed by heating in air for ½ hour at 1000° C.

*Example 5.*—"Inconel" (Cr 13%, Fe 6.5%, balance Ni) on which a nickel oxide film was developed by heating in air for 6 hours at 1000° C.

*Example 6.*—Sintered nickel oxide prepared by sintering a pressed nickel oxide powder body at 1600° C. in air.

*Example 7.*—Nickel+25% magnesia made by ball milling 300 mesh nickel and magnesia powders, waxing, pressing and sintering at 1380–1400° C. in a similar manner to that described in Example 2. The surface was then oxidised by heating for ½ hour in air at 100° C.

*Examples 8–10.*—Nickel+25%, 40%, and 50% mullite respectively made and oxidised in a similar manner to that described in Example 7.

*Example 11.*—Cobalt+25% mullite, made and oxidised in a similar manner to that described in Example 7.

The results of the tests on the specimen were as follows:

| Ex. No. | Material (oxidised) | Oxide film thickness (microns) | Coeff. of friction | Comments |
|---|---|---|---|---|
| 3 | Cast nickel | 9 | .34 | Oxide film tended to break down towards the end of the test. |
| 4 | Monel | 5 | .51 | Unsatisfactory. Poor oxide film. |
| 5 | Inconel | 4 | .36 | Fairly satisfactory operation. |
| 6 | Sintered nickel oxide | | .35 | Good smooth operation. |
| 7 | Sintered Ni+25% MgO | 7 | .37 | Do. |
| 8 | Sintered Ni+25% mullite | 5 | .32 | Do. |
| 9 | Sintered Ni+40% mullite | 7 | .36 | Do. |
| 10 | Sintered Ni+50% mullite | 4 | .42 | Some surface cracks after test. |
| 11 | Sintered cobalt +25% mullite | 9 | .30 | Good smooth operation. |

Generally comparable results were obtained using counterface materials such as, for example, chromium plated steel or high temperature resistant stainless steel, and "Stellite 12" unoxidised.

Figure 2:
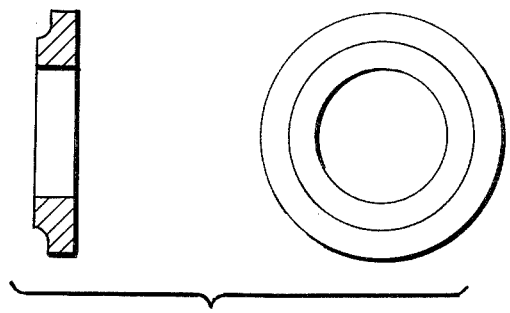

Examples of anti-friction elements according to the invention are shown in the accompanying drawings in which FIG. 1 shows a bearing and FIG. 2 shows a sealing ring in which the surface contains a substantial proportion of nickel or cobalt oxide.

What is claimed is:

1. A bearing assembly comprising two relatively movable elements in contact, the contacting area of at least one of the elements containing at least 50% of at least one material selected from the group containing nickel oxide and cobalt oxide.

2. A bearing assembly comprising two relatively movable elements in contact, the contacting area of at least one of the elements containing at least 60 percent of at least one material selected from the group containing nickel oxide and cobalt oxide.

3. A bearing assembly comprising two relatively movable elements in contact, at least one of said elements being manufactured from a composition containing at least 50% of at least one material selected from the group containing nickel oxide and cobalt oxide.

4. A bearing assembly comprising two relatively movable elements in contact, at least one of said elements being manufactured from a composition containing at least 60 percent of at least one material selected from the group containing nickel oxide and cobalt oxide.

5. A bearing assembly according to claim 4 in which said composition is made of sintered powders of at least one material selected from the group containing nickel oxide and cobalt oxide and a ceramic material.

6. A bearing assembly according to claim 5 in which the ceramic material is mullite.

7. A bearing assembly comprising two relatively movable elements in contact, at least one of said elements being made of a sintered powder of a material selected from the group containing nickel oxide and cobalt oxide.

8. A bearing assembly comprising two relatively movable elements in contact, at least one of said elements being manufactured from a composition containing at least 50% of at least one metal selected from the group containing nickel and cobalt and having an in situ surface layer of oxide.

9. A bearing assembly comprising two relatively movable elements in contact, at least one of said elements being manufactured from a composition containing at least 60% of at least one metal selected from the group containing nickel and cobalt and having an in situ surface layer of oxide.

10. A bearing assembly according to claim 9 in which said composition is made with sintered powders of the metal and a ceramic material.

11. A bearing assembly according to claim 10 wherein the ceramic material is mullite.

12. A bearing assembly comprising two relatively movable elements in contact, at least one of said elements being manufactured from a sintered body of at least one metal powder selected from the group containing nickel and cobalt and at least one powder of a material selected from the group containing nickel oxide and cobalt oxide, the sintered body having an in situ surface layer of oxide.

13. A bearing assembly comprising two relatively movable elements in contact, at least one of said elements being manufactured from a sintered body of nickel powder and powdered magnesia, the amount of nickel powder being at least 50 percent by weight of the sintered body and having an in situ surface layer of oxide.

14. A method of treating an anti-friction element of a bearing assembly comprising two anti-friction elements in relatively movable contact, said anti-friction element to be treated containing at least 50% of at least one metal selected from the group containing nickel and cobalt comprising subjecting said anti-friction element to surface oxidation to form an oxide in situ on the element surface which is in contact with the other element of the bearing assembly.

15. A method of treating an anti-friction element of a bearing assembly comprising two anti-friction elements in relatively movable contact, said anti-friction element to be treated containing at least 60% of at least one metal selected from the group containing nickel and cobalt comprising subjecting said anti-friction element to surface oxidation to form an oxide in situ on the element surface which is in contact with the other element of the bearing assembly.

16. A method of treating an anti-friction element of a bearing assembly comprising two anti-friction elements in relatively movable contact, said anti-friction element to be treated being from a sintered body of at least one metal powder selected from the group containing nickel and cobalt and at least one powder of a material selected from the group containing nickel oxide and cobalt oxide, comprising subjecting said anti-friction element to surface oxidation to form an oxide in situ on the element surface which is in contact with the other element of the bearing assembly.

17. A method of treating an anti-friction element of a bearing assembly comprising two anti-friction elements in relatively movable contact, said anti-friction element to be treated being from a sintered body of nickel powder and powdered magnesia, the amount of nickel powder being at least 50 percent by weight of the sintered body, comprising subjecting said anti-friction element to surface oxidation to form an oxide in situ on the element surface which is in contact with the other element of the bearing assembly.

References Cited in the file of this patent

UNITED STATES PATENTS

| | | |
|---|---|---|
| 1,615,750 | Fulcher | Jan. 25, 1927 |
| 1,634,768 | Bonner | July 5, 1927 |
| 1,786,482 | Curtis | Dec. 30, 1930 |
| 1,802,695 | Bennett | Apr. 28, 1931 |
| 1,878,870 | Linder | Sept. 20, 1932 |
| 2,105,015 | Singer | Jan. 11, 1938 |
| 2,372,203 | Hensel | Mar. 27, 1945 |
| 2,412,925 | Stupakoff | Dec. 17, 1946 |
| 2,537,165 | Smith | Jan. 9, 1951 |
| 2,725,265 | Daniels | Nov. 29, 1955 |